(12) United States Patent
Tsai

(10) Patent No.: US 8,643,794 B2  
(45) Date of Patent: Feb. 4, 2014

(54) HEAT-INSULATING FILM

(75) Inventor: Sui-Ho Tsai, Taoyuan Hsien (TW)

(73) Assignee: A+ R&D Technology Co., Ltd., Taoyuan County (TW)

( * ) Notice: Subject to any disclaimer, the term of this patent is extended or adjusted under 35 U.S.C. 154(b) by 93 days.

(21) Appl. No.: 13/444,863

(22) Filed: Apr. 12, 2012

(65) Prior Publication Data

US 2013/0107191 A1   May 2, 2013

(30) Foreign Application Priority Data

Nov. 1, 2011 (TW) ............... 100139796 A

(51) Int. Cl.
   *G02F 1/1335* (2006.01)
(52) U.S. Cl.
   USPC ............................................. 349/16; 349/115
(58) Field of Classification Search
   USPC ..................................... 349/16, 115
   See application file for complete search history.

(56) References Cited

U.S. PATENT DOCUMENTS

2007/0109673 A1 * 5/2007 Padiyath et al. ............... 359/839
2012/0094118 A1 * 4/2012 Oki et al. ...................... 428/354

FOREIGN PATENT DOCUMENTS

| JP | 07-010609 | 1/1995 |
| JP | 2000-028827 | 1/2000 |
| JP | 2000-246831 | 9/2000 |
| JP | 2009-227938 | 10/2009 |
| JP | 2010-286643 | 12/2010 |
| JP | 2011-107321 | 6/2011 |
| JP | 2011-154215 | 8/2011 |
| KR | 10-2008-0059444 A | 6/2008 |
| KR | 10-2011-0113879 A | 10/2011 |

* cited by examiner

*Primary Examiner* — Phu Vu  
(74) *Attorney, Agent, or Firm* — CKC & Partners Co., Ltd.

(57) ABSTRACT

Disclosed herein is a heat-insulating film (window solar film) including an absorbing layer and a cholesteric liquid crystal layer. The absorbing layer is used to absorb ultraviolet light and infrared light. The pitch of the cholesteric liquid crystal layer is configured in a way such that the cholesteric liquid crystal layer reflects the infrared light.

19 Claims, 4 Drawing Sheets

HEAT-INSULATING FILM

RELATED APPLICATIONS

This application claims priority to Taiwan Application Serial Number 100139796, filed Nov. 1, 2011, which is herein incorporated by reference.

BACKGROUND

1. Field of Invention

The embodiment of the present invention relates generally to a heat-insulating film and, more particularly, to a heat-insulating film having a cholesteric liquid crystal layer.

2. Description of Related Art

In recent years, the demand for more convenient, robust and economical goods has continued to rise along with the increase in socio-economic standards. Technological advances and progress in industry have provided the means to meet such a demand. Nevertheless, products with more economic value and other advantages continue to be developed to meet these and other needs.

The principal purpose of heat-insulating films is to retard the flow of heat. Heat-insulating films are commonly installed on windows of transportation vehicles and buildings. Statistics indicate that energy for air conditioning accounts for about 47% of the total energy consumption in commercial buildings. Accordingly, strategies for reducing electricity demand are important in reducing the operating costs of a building.

The infrared component of sunlight is the main natural heat source. When the infrared component of sunlight enters a building, a rise in the temperature inside the building generally results. Therefore, air conditioning is required to lower the room temperature in commercial buildings.

Heat-insulating films are commonly attached to windows of commercial buildings to reduce the radiation level entering the buildings. However, conventional heat-insulating films block both the infrared component and the visible light component of sunlight. The reduced transmission of the visible light component leads to a reduction in brightness in commercial buildings.

In view of the foregoing, conventional heat-insulating films have several drawbacks associated therewith, and a solution to these problems has been long awaited by the industry. Accordingly, there exists a need in the art for providing heat-insulating films capable of blocking the incidence of infrared light while allowing visible light to pass therethrough.

SUMMARY

One goal of the present disclosure is to provide a heat-insulating film capable of reducing the incidence of infrared light while maintaining the desired transmittance of visible light.

To this end, in one aspect, the present disclosure is directed to a heat-insulating film. The heat-insulating film comprises at least one absorbing layer and at least one cholesteric liquid crystal layer. The absorbing layer absorbs ultraviolet light and infrared light. The cholesteric liquid crystal layer is disposed under the absorbing layer, and the pitch of the cholesteric liquid crystal layer is configured in a way such that the cholesteric liquid crystal layer reflects the infrared light.

According to one embodiment of the present disclosure, the heat-insulating film has an average visible light transmittance of 50% to 80%. According to another embodiment of the present disclosure, the heat-insulating film has an infrared reflectance of 70% to 99%.

According to yet another embodiment of the present disclosure, the cholesteric liquid crystal layer is formed by coating.

According to still another embodiment of the present disclosure, the absorbing layer comprises a metal layer. Examples of metal suitable for forming the metal layer include, but are not limited to, silver, aluminum, tungsten, magnesium, molybdenum, zinc, tin, indium, chromium, antimony, titanium, nickel, copper, vanadium, cobalt, iron, and niobium, and alloys thereof.

According to still another embodiment of the present disclosure, the absorbing layer comprises a metal oxide layer. Examples of metal oxide suitable for forming the metal layer include, but are not limited to, silver oxide, aluminum oxide, tungsten oxide, magnesium oxide, molybdenum oxide, zinc oxide, tin oxide, indium oxide, chromium oxide, antimony oxide, titanium oxide, nickel oxide, copper oxide, vanadium oxide, cobalt oxide, iron oxide, niobium oxide, indium tin oxide, aluminum doped zinc oxide, and antimony tin oxide.

According to examples of the present disclosure, the metal layer or the metal oxide layer is formed by sputtering, vapor deposition or coating. Generally, the metal layer and/or the metal oxide layer function as an ultraviolet absorbent and/or an infrared absorbent. Optionally, the absorbing layer may comprise at least one additional ultraviolet absorbent and/or an infrared absorbent.

According to another embodiment of the present disclosure, the heat-insulating film further comprises a substrate which is disposed under the cholesteric liquid crystal layer or between the absorbing layer and the cholesteric liquid crystal layer. The substrate may be a fibrous substrate or a film substrate.

According to yet another embodiment of the present disclosure, the substrate is made of at least one synthetic material, non-limiting examples of which include polyethylene terephthalate (PET) and triacetyl cellulose (TAC).

According to still another embodiment of the present disclosure, the heat-insulating film further comprises another cholesteric liquid crystal layer which is disposed under the substrate. According to yet another embodiment of the present disclosure, the heat-insulating film further comprises another absorbing layer which is disposed under said another cholesteric liquid crystal layer.

According to still another embodiment of the present disclosure, the heat-insulating film further comprises another absorbing layer which is disposed under the substrate.

According to yet another embodiment of the present disclosure, the heat-insulating film further comprises an anti-scratch layer which is disposed above the absorbing layer so as to protect the heat-insulating film against damage from scratches.

According to still another embodiment of the present disclosure, the heat-insulating film further comprises a release layer and an adhesive layer. The release layer is the lowermost layer of the heat-insulating film and covers the adhesive layer. The release film is employed to prevent dirt and other substances from attaching to the adhesive layer and is removed when the heat-insulating film is not in use so that the heat insulating film can be attached to an object via the adhesive layer.

In one aspect, the present disclosure is directed to a heat-insulating film which cut-offs the majority of infrared light while allowing visible light to pass therethrough. The heat-insulating film comprises a substrate, at least one absorbing layer, and at least one cholesteric liquid crystal layer. The substrate has a first surface and an opposite second surface. The absorbing layer for absorbing ultraviolet light and infrared light is disposed over the first substrate, whereas the liquid crystal layer is disposed over the second surface, wherein the pitch of the cholesteric liquid crystal layer is configured in a way such that the cholesteric liquid crystal layer reflects infrared light.

According to one embodiment of the present disclosure, the substrate is made of at least one synthetic material, non-limiting examples of which include polyethylene terephthalate (PET) and triacetyl cellulose (TAC).

According to another embodiment of the present disclosure, the heat-insulating film further comprises an anti-scratch layer which is disposed above the absorbing layer so as to protect the heat-insulating film against damage from scratches.

According to yet another embodiment of the present disclosure, the heat-insulating film further comprises a release layer and an adhesive layer. The release layer is the lowermost layer of the heat-insulating film and covers the adhesive layer. The release film is employed to prevent dirt and other substances from attaching to the adhesive layer and is removed when the heat-insulating film is not in use so that the heat insulating film can be attached to an object via the adhesive layer.

In summary, the heat-insulating films according to various examples of the present disclosure are configured to reduce the incidence of infrared light while maintaining the transmittance of visible light.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1A:
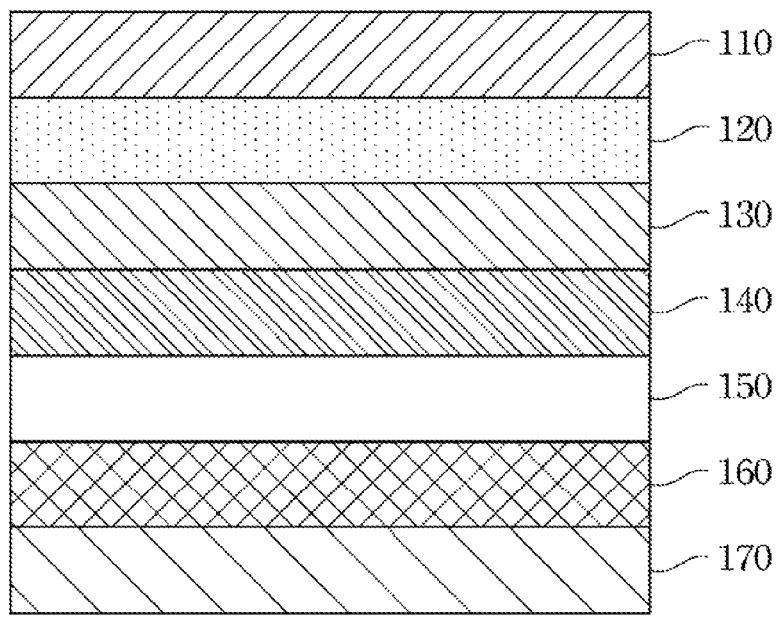
FIGS. 1A to 1E show schematically various heat-insulating films according to embodiments of the present disclosure.

The present disclosure is more particularly described in the following examples that are intended as illustrative only since numerous modifications and variations therein will be apparent to those skilled in the art. Various embodiments of the disclosure are now described in detail with reference to the drawings. In accordance with common practice, the various described features/elements are not drawn to scale but instead are drawn to best illustrate specific features/elements relevant to the present invention. Also, like reference numerals and designations in the various drawings are used to indicate like elements/parts. Descriptions of well-known components and processing techniques are omitted so as to not unnecessarily obscure the present invention.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a," "an," and "the" includes plural reference unless the context clearly dictates otherwise. As used herein, "around," "about" or "approximately" shall generally mean within 20 percent, preferably within 10 percent, and more preferably within 5 percent of a given value or range. Numerical quantities given herein are approximate, meaning that the term "around," "about" or "approximately" can be inferred if not expressly stated. As used herein, the terms "comprising," "including," "having," "containing," "involving," and the like are to be understood to be open-ended, i.e., to mean including but not limited to.

FIG. 1A shows schematically a heat-insulating film according to one embodiment of the present disclosure. As illustrated in FIG. 1A, the heat-insulating film comprises a protective layer 110, an anti-scratch layer 120, an absorbing layer 130, a cholesteric liquid crystal layer 140, a substrate 150, an adhesive layer 160, and a release layer 170. The absorbing layer 130 is able to absorb ultraviolet light and infrared light, and the pitch of the cholesteric liquid crystal layer 140 is configured in a way such that the cholesteric liquid crystal layer 140 is able to reflect infrared light. The substrate 150 is disposed under the cholesteric liquid crystal layer 140.

The anti-scratch layer 120 is disposed over the absorbing layer 130 so as to protect the heat-insulating film against scratches. The protective layer 110 is disposed over the anti-scratch layer 120 so as to prevent the heat-insulating film from being damaged and prolong the service life of the heat-insulating film. Due to the adhesive nature of the adhesive layer 160, dirt or other substances in the environment tend to stick to the adhesive layer 160, thereby jeopardizing the adhesiveness of the adhesive layer 160. Therefore, the release layer 170 is disposed as the lowermost layer of the heat-insulating film so as to protect the adhesive layer 160 when the heat-insulating layer is not in use. During installation, the release layer 170 is removed (e.g., peeled-off), thereby exposing the adhesive layer 160, and then the heat-insulating film is attached to an object via the adhesive layer 160.

Cholesteric liquid crystals are chiral nematic liquid crystals. They organize in layers, and after the addition of chiral dopants, a helical structure is formed therein. The distance between two axes lying parallel to each other in a plane is known as the pitch. The reflecting nature of the cholesteric liquid crystal layer depends on the pitch. Accordingly, it is possible to alter the wavelength to be reflected by the cholesteric liquid crystal layer by adjusting the pitch of the cholesteric liquid crystal layer. For example, a cholesteric liquid crystal layer having a pitch of about 612 nm is capable of reflecting infrared radiation with a wavelength of about 1000 nm. The wavelength of the light to be reflected increases as the pitch increases. Therefore, in one example, the pitch of the cholesteric liquid crystal layer is about 500-1000 nm; in another example, the pitch is about 550-900 nm; and in still another example, the pitch is about 600-800 nm. Test results show that the cholesteric liquid crystal layer 140 having a pitch of about 612 nm may effectively reflect more than 60% of infrared radiation with a wavelength greater than 1000 nm, and allow more than 80% of visible light with a wavelength in the range of 400-800 nm to pass therethrough. Accordingly, the infrared reflectance of the heat-insulating film can be improved by employing a cholesteric liquid crystal layer with a predetermined pitch.

In one embodiment, the heat-insulating film having the cholesteric liquid crystal layer 140 has an average visible light transmittance of about 50% to 80%. In another embodiment, the heat-insulating film has an average visible light transmittance of about 55% to 75%. In still another embodiment, the heat-insulating film has an average visible light transmittance of about 60% to 70%.

In another embodiment, the heat-insulating film having the cholesteric liquid crystal layer 140 has an infrared reflectance of about 70% to 99%. In another embodiment, the heat-insulating film has an infrared reflectance of about 75% to 95%. In still another embodiment, the heat-insulating film has an infrared reflectance of about 80% to 90%.

Each of these component layers may be prepared by methods and techniques well known in the art. In one embodiment, the cholesteric liquid crystal layer 140 is formed by coating.

According to one embodiment of the present disclosure, the absorbing layer 120 comprises a metal layer. According to another embodiment of the present invention, the absorbing layer 120 comprises a metal oxide layer. The metal layer or the metal oxide layer may be formed by sputtering, vapor deposition, or coating.

The metal layer may comprise any metal suitable for use herein, and non-limiting examples include silver, aluminum, tungsten, magnesium, molybdenum, zinc, tin, indium, chromium, antimony, titanium, nickel, copper, vanadium, cobalt, iron, niobium, and alloys thereof.

Examples of metal oxides suitable for forming the metal layer include, but are not limited to, silver oxide (e.g., AgO), aluminum oxide (e.g., $Al_2O_3$), tungsten oxide (e.g., $WO_2$ or $WO_3$), magnesium oxide (e.g., MgO), molybdenum oxide (e.g., $MoO_3$), zinc oxide (e.g., ZnO), tin oxide (e.g., $SnO_2$), indium oxide (e.g., $In_2O_3$), chromium oxide (e.g., $CrO_3$ or $Cr_2O_3$), antimony oxide (e.g., $Sb_2O_3$ or $Sb_2O_5$), titanium oxide (e.g., $TiO_2$), nickel oxide (e.g., NiO), copper oxide (e.g., CuO or $Cu_2O$), vanadium oxide (e.g., $V_2O_3$ or $V_2O_5$), cobalt oxide (e.g., CoO), iron oxide (e.g., $Fe_2O_3$ or $Fe_3O_4$), niobium oxide (e.g., $Nb_2O_5$), indium tin oxide (ITO), aluminum doped zinc oxide (AZO), and antimony tin oxide (ATO). In some embodiments, the metal layer may consist of more than one metal oxide described hereinabove.

In various embodiments, the substrate 150 may be a fibrous substrate or a film substrate. For example, the substrate 150 may be made of polyethylene terephthalate (PET) fibers or triacetyl cellulose (TAC) films.

FIGS. 1B to 1E show schematically various heat-insulating films according to other embodiments of the present disclosure. It should be noted that the heat-insulating films as shown in FIGS. 1B to 1E are structurally similar to the heat-insulating film of FIG. 1A. Accordingly, a detailed description of these heat-insulating films is omitted for the sake of brevity, and only the differences relating to the arrangement of the component layers is provided hereinafter.

Figure 1B:
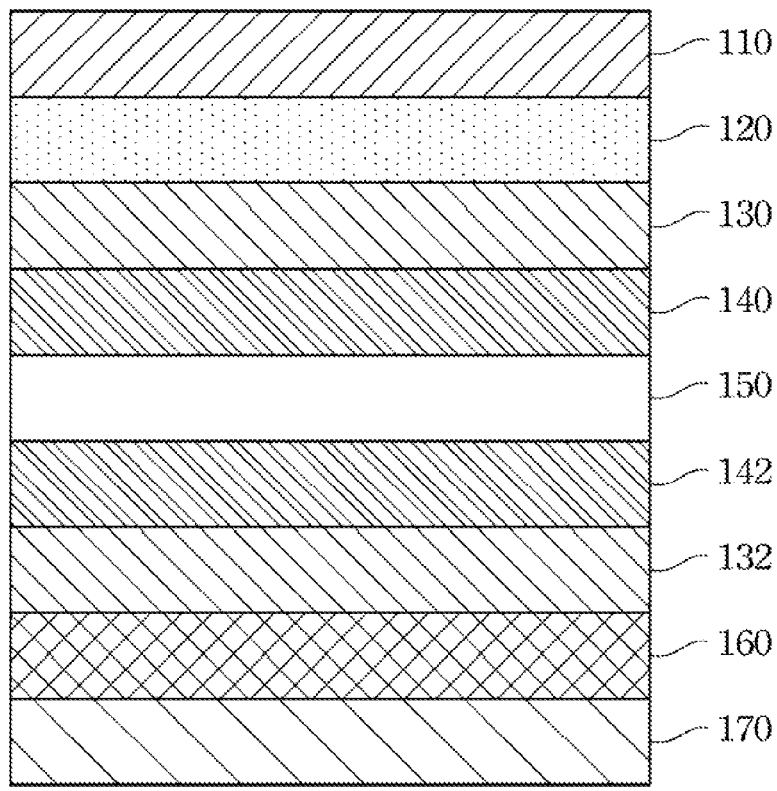

As shown in FIG. 1B, the heat-insulating film comprises an additional cholesteric liquid crystal layer 142 and an additional absorbing layer 132. The additional cholesteric liquid crystal layer 142 is disposed under the substrate 150, and the additional absorbing layer 132 is disposed under said additional cholesteric liquid crystal layer 142. It should be noted that the additional cholesteric liquid crystal layer 142 and the absorbing layer 132 respectively function in the way explained hereinabove regarding the cholesteric liquid crystal layer 140 and the absorbing layer 130, and a detailed description regarding these layers is omitted for the sake of brevity.

Figure 1C:
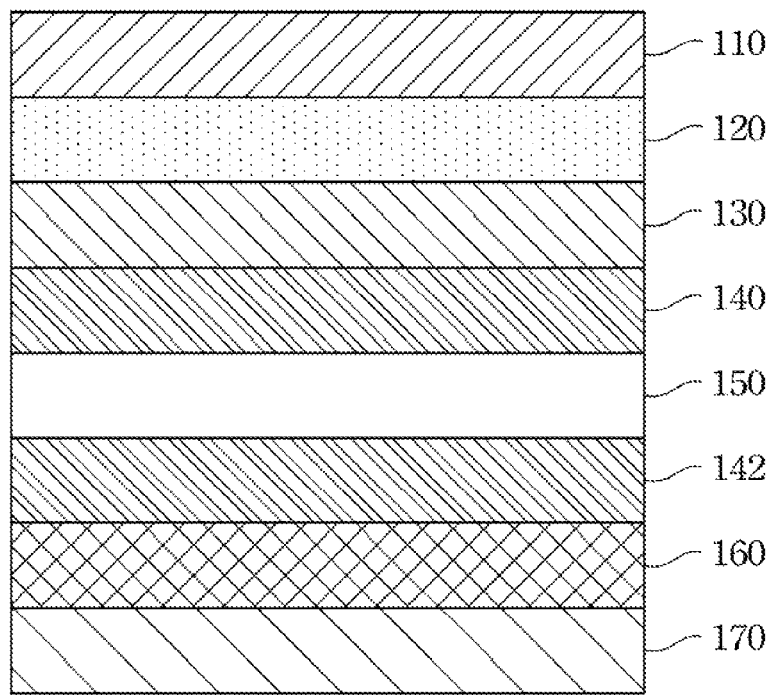
Figure 1D:
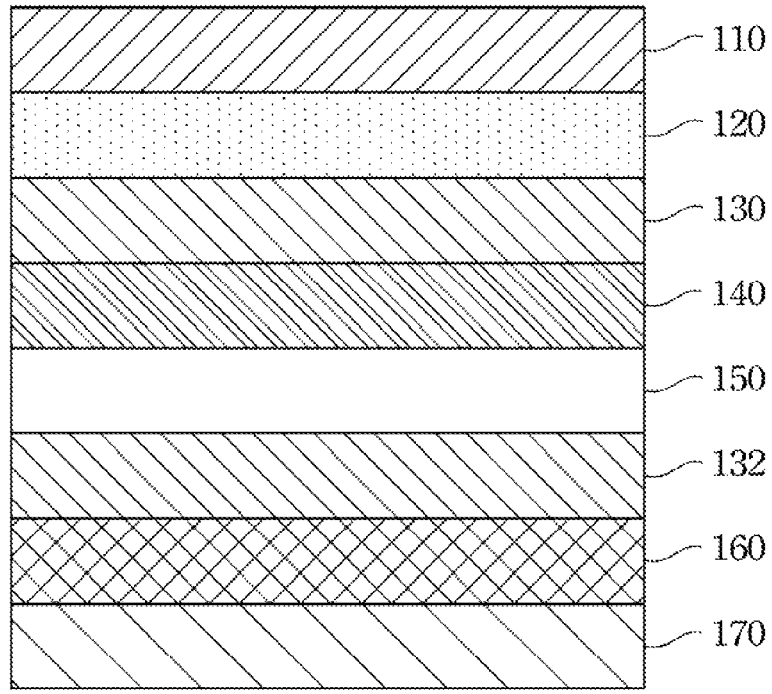
Figure 1E:
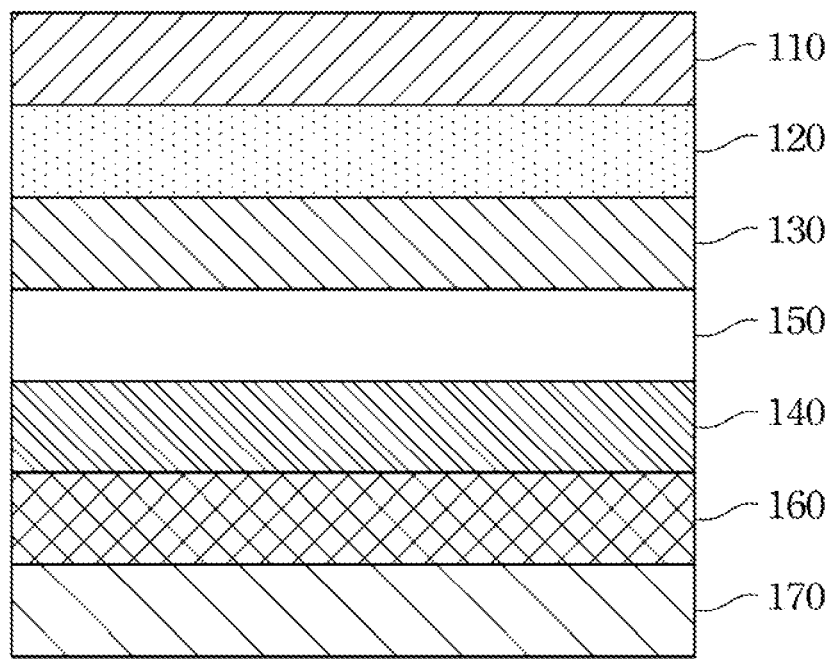

The heat-insulating film of FIG. 1C, when compared with that of FIG. 1A, further comprises an additional cholesteric liquid crystal layer 142 which is disposed under the substrate 150. The heat-insulating film of FIG. 1D, when compared with that of FIG. 1A, further comprises an additional absorbing layer 132 which is disposed under the substrate 150. As may be appreciated, the additional cholesteric liquid crystal layer 142 and the absorbing layer 132 respectively function in the way explained hereinabove regarding the cholesteric liquid crystal layer 140 and the absorbing layer 130, and a detailed description regarding these layers is omitted for the sake of brevity. As shown in FIG. 1E, the substrate 150 is disposed between the absorbing layer 130 and the cholesteric liquid crystal layer 140.

Figure 2:
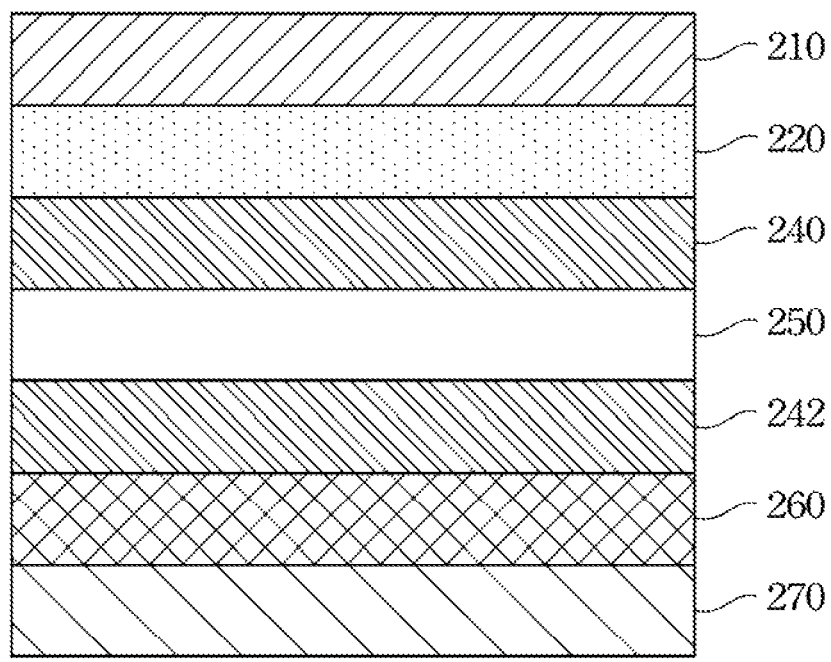
FIG. 2 shows schematically a heat-insulating film according to another embodiment of the present disclosure.

It should be noted that the arrangement of the component layers of the heat-insulating layer may be adjusted as desired. For example, the heat-insulating film as shown in FIG. 2 illustrates another embodiment of the present invention. The heat-insulating film of FIG. 2 comprises a protective layer 210, an anti-scratch layer 220, a first cholesteric liquid crystal layer 240, a substrate 250, a second cholesteric liquid crystal layer 242, an adhesive layer 260, and a release layer 270.

The substrate 250 comprises a first surface and an opposite second surface, and the first and second cholesteric liquid crystal layers 240 and 242 are disposed on the first and second surfaces, respectively. The pitches of the first and second cholesteric liquid crystal layers 240 and 242 are adjusted in a way such that the first and second cholesteric liquid crystal layers 240 and 242 may reflect infrared light. Optionally, the first and second cholesteric liquid crystal layers 240 and 242 may have different pitches, each capable of reflecting infrared light with different wavelengths, so as to enhance the overall infrared reflectance of the heat-insulating layer.

Still referring to FIG. 2, the anti-scratch layer 220 is disposed over the first cholesteric liquid crystal layer 240 to protect the heat-insulating film against damage from scratches, whereas the protective layer 210 is disposed over the anti-scratch layer 220 to prevent the heat-insulating film from being damaged, thereby prolonging the service life of the heat-insulating film. Similar to the heat-insulating layer of FIG. 1A, the present heat-insulating layer has a release layer 270 disposed as the lowermost layer of the heat-insulating film so as to protect the adhesive layer 260 when the heat-insulating layer is not in use. During installation, the release layer 270 is removed (e.g., peeled-off), thereby exposing the adhesive layer 260, and then the heat-insulating film is attached to an object via the adhesive layer 260.

Summarized in Table 1 are the light transmittance properties of a conventional heat-insulating film which does not have a cholesteric liquid crystal layer and the present heat-insulating film which has the cholesteric liquid crystal layer (hereinafter, CLC heat-insulating film). As is well known in the related art, the infrared component of solar radiation is the main source of thermal energy in the environment. Accordingly, in the present disclosure, the heat insulating rate is defined as the infrared reflectance of the heat-insulating film. As discussed hereinabove, the present disclosure is directed to a heat-insulating film having a desired infrared reflectance (i.e., heat insulating rate) as well as a desired visible light transmittance. Therefore, the sum of visible light transmittance and infrared reflectance is used in what is referred to herein as the "total effect" of a heat-insulating film. In this context, the heat-insulating film with a higher total effect would be preferred by consumers.

TABLE 1

|  | Visible Light Transmittance (%) | Infrared Light Transmittance (%) | Heat Insulating Rate (%) | Total Effect |
|---|---|---|---|---|
| Conventional heat-insulating film | 70 | >30 | <70 | <140 |
| CLC heat-insulating film | 70 | <10 | >90 | >160 |

As can be seen in Table 1, the visible light transmittance of the CLC heat-insulating film according to one embodiment of the present disclosure is similar to that of the conventional heat-insulating film. This result suggests that the addition of the CLC layer does not substantially jeopardize the visible light transmittance of the present heat-insulating film. On the other hand, the CLC heat-insulating film exhibited a significantly lower infrared light transmittance (<10%), as compared to the conventional heat-insulating film (IR transmittance >30%). In other words, the heat insulating rate of the CLC heat-insulating film (>90%) is improved over the conventional heat-insulating film (heat insulating rate <70%). In sum, the total effect of the CLC heat-insulating film is greater than 160, whereas the total effect of the conventional heat-insulating film is less than 140.

Figure 3:
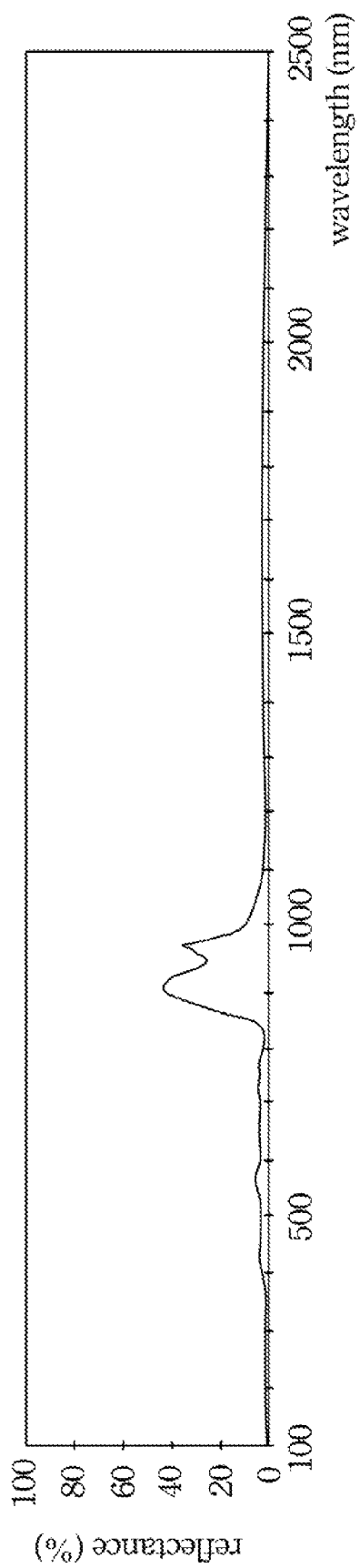
FIG. 3 is a graph showing the reflectance to solar radiation of a heat-insulating film according to one embodiment of the present disclosure.

FIG. 3 is a graph showing the reflectance to solar radiation of a heat-insulating film according to one embodiment of the present disclosure. As shown in FIG. 3, the present heat-insulating film effectively reflects infrared radiation with a wavelength of about 800 nm to about 2500 nm. Since infrared light is blocked and therefore prevented from entering the interior space of a building on which the heat-insulating film is installed, the temperature of this space is substantially lowered.

Figure 4:
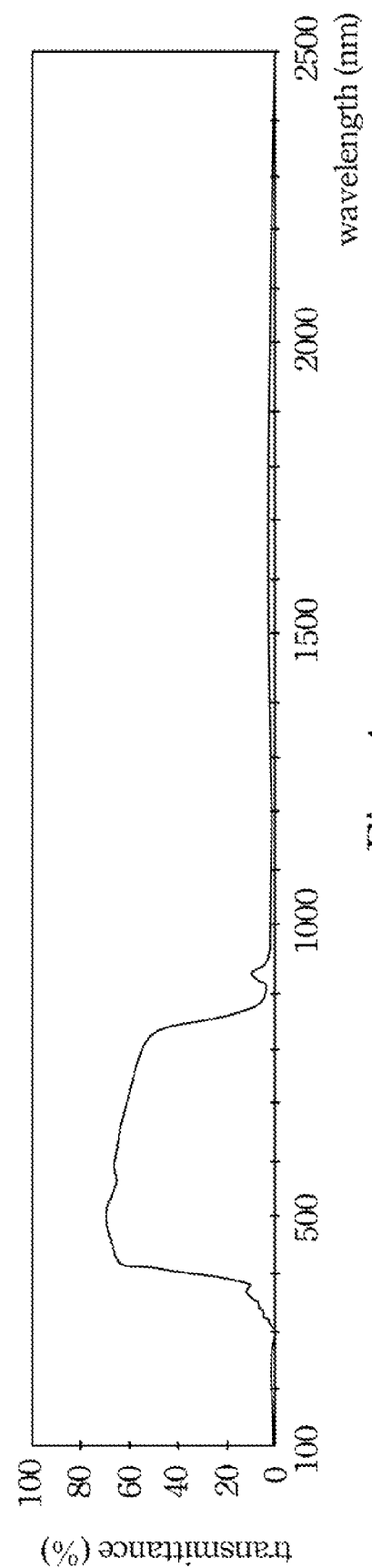
FIG. 4 is a graph showing the transmittance to solar radiation of a heat-insulating film according to one embodiment of the present disclosure.

FIG. 4 is a graph showing the transmittance to solar radiation of a heat-insulating film according to one embodiment of the present disclosure. As shown in FIG. 4, the present heat-insulating film allows about 60% to 80% of visible radiation with a wavelength of about 400 nm to about 800 nm to pass therethrough. Therefore, this indicates that the brightness of the interior space of a building on which the heat-insulating film is installed would not be substantially lowered.

Together, these results demonstrate that the present heat-insulating film provides an improved heat-insulating effect as well as satisfactory visible light transmittance.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A heat-insulating film, comprising,
   at least one absorbing layer which absorbs ultraviolet light and infrared light;
   at least one cholesteric liquid crystal layer disposed under the absorbing layer, wherein the pitch of the cholesteric liquid crystal layer is configured such that the cholesteric liquid crystal layer reflects infrared light;
   an adhesive layer; and
   a release layer disposed as the lowermost layer of the heat-insulating film covering the adhesive layer.

2. The heat-insulating film according to claim 1, wherein the heat-insulating film has a visible light transmittance of about 50% to 80%.

3. The heat-insulating film according to claim 1, wherein the heat-insulating film has an infrared reflectance of about 70% to 99%.

4. The heat-insulating film according to claim 1, wherein the cholesteric liquid crystal layer is formed by coating.

5. The heat-insulating film according to claim 1, wherein the absorbing layer comprises a metal layer and/or a metal oxide layer.

6. The heat-insulating film according to claim 5, wherein the metal layer comprises a material selected from the group consisting of silver, aluminum, tungsten, magnesium, molybdenum, zinc, tin, indium, chromium, antimony, titanium, nickel, copper, vanadium, cobalt, iron, niobium, and an alloy thereof.

7. The heat-insulating film according to claim 5, wherein the metal oxide layer comprises a material selected from the group consisting of silver oxide, aluminum oxide, tungsten oxide, magnesium oxide, molybdenum oxide, zinc oxide, tin oxide, indium oxide, chromium oxide, antimony oxide, titanium oxide, nickel oxide, copper oxide, vanadium oxide, cobalt oxide, iron oxide, niobium oxide, indium tin oxide, aluminum doped zinc oxide, and antimony tin oxide.

8. The heat-insulating film according to claim 5, wherein the metal layer or the metal oxide layer is formed by sputtering, vapor deposition, or coating.

9. The heat-insulating film according to claim 1, further comprising:
   a substrate disposed between the absorbing layer and the cholesteric liquid crystal layer.

10. The heat-insulating film according to claim 9, wherein the substrate comprises a polyethylene terephthalate material or a triacetyl cellulose material.

11. The heat-insulating film according to claim 1, further comprising:
   a substrate disposed under the cholesteric liquid crystal layer.

12. The heat-insulating film according to claim 11, wherein the substrate comprises a polyethylene terephthalate material or a triacetyl cellulose material.

13. The heat-insulating film according to claim 11, further comprising:
   another absorbing layer disposed under the substrate.

14. The heat-insulating film according to claim 11, further comprising:
   another cholesteric liquid crystal layer disposed under the substrate.

15. The heat-insulating film according to claim 14, further comprising:
   another absorbing layer disposed under said another cholesteric liquid crystal layer.

16. The heat-insulating film according to further comprising:
   an anti-scratch layer disposed over the absorbing layer.

17. A heat-insulating film, comprising:
   a substrate comprising a first surface and an opposite second surface;
   a first cholesteric liquid crystal layer disposed over the first layer, wherein the pitch of the first cholesteric liquid crystal layer configured such that the first cholesteric liquid crystal layer reflects infrared light;
   a second cholesteric liquid crystal layer disposed over the second surface, wherein pitch of the second cholesteric liquid crystal layer is configured such that the second cholesteric liquid crystal layer reflects infrared light;

an adhesive layer; and a release layer disposed as the lowermost layer of the heat-insulating film covering the adhesive layer.

18. The heat-insulating film according to claim 17, wherein the substrate comprises a polyethylene terephthalate material or a triacetyl cellulose material.

19. The heat-insulating film according to claim 17, further comprising:

an anti-scratch layer disposed over the first cholesteric liquid crystal layer.

* * * * *